United States Patent [19]

Dorfman et al.

[11] Patent Number: 5,006,321
[45] Date of Patent: Apr. 9, 1991

[54] THERMAL SPRAY METHOD FOR PRODUCING GLASS MOLD PLUNGERS

[75] Inventors: Mitchell R. Dorfman, Smithtown; Roger W. Kaufold, Huntington; Burton Kushner, Old Bethpage; Anthony J. Rotolico, Hauppauge; Roopnarine Tilkaran, S. Ozone Park, all of N.Y.

[73] Assignee: The Perkin-Elmer Corporation, Norwalk, Conn.

[21] Appl. No.: 293,268

[22] Filed: Jan. 4, 1989

[51] Int. Cl.⁵ .................. B05D 3/02; B05D 3/12
[52] U.S. Cl. ...................... 427/192; 427/57;
427/191; 427/289; 427/367; 427/376.6;
427/376.7; 427/380; 427/383.5; 427/397.7;
427/423
[58] Field of Search .......... 427/289, 191, 57, 34,
427/423, 367, 192, 376.6, 376.7, 380, 383.5,
397.7

[56] References Cited

U.S. PATENT DOCUMENTS

| 2,317,173 | 2/1940 | Bleakley | 91/12.2 |
| 2,875,043 | 2/1959 | Tour | 75/134 |
| 3,455,510 | 11/1966 | Rotolico | 239/85 |
| 3,530,892 | 3/1967 | Charlop | 137/625.19 |
| 3,617,358 | 9/1967 | Dittrich | 117/105.2 |
| 4,382,811 | 3/1981 | Luscher et al. | 65/374.11 |
| 4,416,421 | 7/1981 | Browning | 239/79 |

FOREIGN PATENT DOCUMENTS 867455 1/1959 United Kingdom .

Primary Examiner—Bernard Pianalto
Attorney, Agent, or Firm—H. S. Ingham; E. T. Grimes

[57] ABSTRACT

Manufacture of glass mold plungers utilizes a thermal spray gun having combustion chamber with an open channel for propelling combustion products into the ambient atmosphere at supersonic velocity. The method comprises injecting into the chamber a combustible mixture of combustion gas and oxygen at a pressure in the chamber of at least two atmospheres above ambient atmospheric pressure, feeding into the chamber a powder comprising self-fluxing alloy particles, and combusting the combustible mixture in the chamber means whereby a supersonic spray stream containing the powder is propelled through the open channel. The spray stream is directed toward a glass mold plunger substrate such as to produce a coating thereon which is ground and polished. The coating may be fused prior to grinding.

13 Claims, 5 Drawing Sheets

THERMAL SPRAY METHOD FOR PRODUCING GLASS MOLD PLUNGERS

This invention relates to glass mold plungers and particularly to a method for producing glass mold plungers utilizing thermal spraying.

BACKGROUND OF THE INVENTION

Thermal spraying, also known as flame spraying, involves the melting or at least heat softening of a heat fusible material such as metal or ceramic, and propelling the softened material in particulate form against a surface which is to be coated. The heated particles strike the surface where they are quenched and bonded thereto. A thermal spray gun such as described in U.S. Pat. No. 3,455,510 (Rotolico) is used for the purpose of heating and propelling the particles. In this type of thermal spray gun, the heat fusible material is supplied to the gun in powder form. Such powders are comprised typically of small particles, e.g., between 100 mesh U.S. Standard screen size (149 microns) and about 2 microns. Heat for powder spraying is generally from a combustion flame or an arc-generated plasma flame. The carrier gas, which entrains and transports the powder, may be one of the combustion gases or an inert gas such as nitrogen, or it simply may be compressed air.

Quality coatings of certain thermal spray materials have been produced by spraying at high velocity. Plasma spraying has proven successful with high velocity in many respects but it can suffer from non-uniform heating and/or poor particle entrainment which must be effected by feeding powder laterally into the high velocity plasma stream.

Rocket types of powder spray guns recently became practical and are typified in U.S. Pat. No. 4,416,421 (Browning). This type of gun has an internal combustion chamber with a high pressure combustion effluent directed through a nozzle or open channel. Powder is fed into the nozzle chamber to be heated and propelled by the combustion effluent.

Short-nozzle spray devices are disclosed for high velocity spraying in French Patent No. 1,041,056 and U.S. Pat. No. 2,317,173 (Bleakley). Powder is fed axially into a melting chamber within an annular flow of combustion gas. An annular air flow is injected coaxially outside of the combustion gas flow, along the wall of the chamber. The spray stream with the heated powder issues from the open end of the combustion chamber.

Sprayweld alloys of the boron-silicon-nickel type are known in the art, and comprise a nickel base to which is added relatively small percentages of boron and silicon to improve the fluxing characteristics of the nickel base alloy. Other elements, such as chromium, are frequently included in nickel base alloys of this type.

Such alloys are used for welding and brazing and particularly for coating materials applied as a fused or welded over-lay on base materials, such as steel or steel alloys. The elements boron and silicon, when added to nickel or nickel base alloys, act as fluxer of the alloy and of the surface to be alloyed during the fusing of the alloy when performing the brazing, welding or coating operation. For this reason such alloys are known as "self-fluxing alloys".

One process frequently used for applying fused coatings of boron-silicon-nickel alloys is known as "spray-welding". Spray-welding comprises the steps of first metal spraying the alloy onto the surface to be coated such as with a combustion powder spray gun of the type disclosed in the aforementioned U.S. Pat. No. 3,455,510, and second, fusing the coating in place. The metal spraying operation can be carried out by any of the known metal spraying techniques, in which the material to be sprayed is fed into a heating zone where it is melted or heat-softened and from which it is, in finely divided form, propelled in molten or heat-plastic condition onto the surface to be coated. After coatings have been applied by the metal spraying process, they are thereafter fused in the carrying out of the spray-welding process. Such fusing may be done in a furnace or, alternatively, by means of heating torches applied directly to the coated surface. Self-fluxing alloys and typical compositions are described in more detail in U.S. Pat. No. 2,875,043 (Tour).

Although fused coatings of self-fluxing alloys are quite wear resistant per se, further wear resistance is gained by blending hard particles such as a carbide powder with the alloy powder prior to spraying. Such a carbide generally includes a metal binder, such as tungsten carbide in a cobalt matrix as disclosed in British Patent No. 867,455. Fused thermal sprayed self-fluxing alloy coatings, with or without carbide, are susceptible of being ground and polished to a very high finish.

A particular application requiring the wear resistance and finish of such coatings is the production of glass mold plungers. In the manufacture of glass objects such as bottles an early step is to inject a heated rod-shaped plunger into a small mass of heat softened glass to produce an initial hole therein. The glass is thereafter blown into shape with compressed air applied into the hole. It is critical that the plunger have a smooth shape and a high, mirror-like finish in order to prevent flaws from developing in the glass objects. Even a small imperfection in the plunger surface picks up glass to form larger imperfections in subsequent operations with the plunger.

Because of wear and finish capability, thermal spraying has been used for many years for making and refurbishing glass mold plungers. U.S. Pat. No. 4,382,811 (Luscher et al.) teaches such utilization. Although oxide powder blended with the self-fluxing alloy is taught therein, self-fluxing alloy with or without carbide is much more commonly used on plungers.

However, a continuing problem is that it is quite difficult and technique dependent to thermal spray and fuse coatings onto glass mold plungers without flaws. Spray parameters are critical, requiring close control of gas flows, spray distance, traverse rates, spray speed and temperature control. Also, in finishing the coating, the tapered shape of the plunger results in overheating of the tip of the plunger. As a result only certain operators are sufficiently proficient to do the job, so it is expensive and has a high reject rate.

Therefore, objects of the present invention are to provide an improved method of manufacture of glass mold plungers, to provide an improved thermal spray method for manufacturing glass mold plungers, and to provide for the manufacture of glass mold plungers with reduced technique dependence, rejection rate and cost.

SUMMARY OF THE INVENTION

The foregoing and other objects are achieved by a method for manufacturing a glass mold plunger utilizing a thermal spray gun having combustion chamber means therein with a combustion chamber and an open channel for propelling combustion products into the ambient atmosphere at supersonic velocity. The method comprises preparing a glass mold plunger substrate for receiving a thermal sprayed coating, feeding through the open channel a powder comprising self-fluxing alloy particles, injecting into the chamber and combusting therein a combustible mixture of combustion gas and oxygen at a pressure in the chamber sufficient to produce a supersonic spray stream containing the powder issuing through the open channel, directing the spray stream toward the glass mold plunger substrate such as to produce a coating thereon, and grind finishing the coating to a polished finish.

A preferred the self-fluxing alloy consists essentially of about 10% to 18% chromium, 2% to 4% boron, up to 4% silicon, up to a total of 9% of one or more of molybdenum, copper, iron and tungsten, 0.15% to 1.0% carbon, balance nickel and or cobalt. In a further embodiment the powder is a blend consisting essentially of the self-fluxing alloy particles and carbide particles. The carbide particles preferably constitute about 30% to 70% by weight of the blend and consist essentially of −5 micron tungsten carbide subparticles in a cobalt matrix. The cobalt constitutes about 12% to 20% by weight of the total of the tungsten carbide and the cobalt.

In a particular embodiment the thermal spray gun includes a nozzle member with a nozzle face and a tubular gas cap extending from the nozzle member these caps having an inwardly facing cylindrical wall defining a combustion chamber with an open end and an opposite end bounded by the nozzle face. The method then comprises the steps of preparing a glass mold plunger substrate for receiving a thermal sprayed coating, injecting an annular flow of a combustible mixture of a combustion gas and oxygen from the nozzle coaxially into the combustion chamber at a pressure therein of at least two bar above atmospheric pressure, injecting an annular outer flow of pressurized non-combustible gas adjacent to the cylindrical wall radially outward of the annular flow of the combustible mixture, feeding a powder comprising particles having heat stable non-meltable cores and heat softenable surfaces in a carrier gas axially from the nozzle into the combustion chamber, injecting an annular inner flow of pressurized gas from the nozzle member into the combustion chamber coaxially between the combustible mixture and the powder-carrier gas, combusting the combustible mixture in the combustion chamber whereby a supersonic spray stream containing the heat fusible material in finely divided form is propelled through the open end, directing the spray stream toward a substrate such as to produce a coating thereon, and grind finishing the coating to a polished finish.

DETAILED DESCRIPTION OF THE INVENTION

Figure 1:
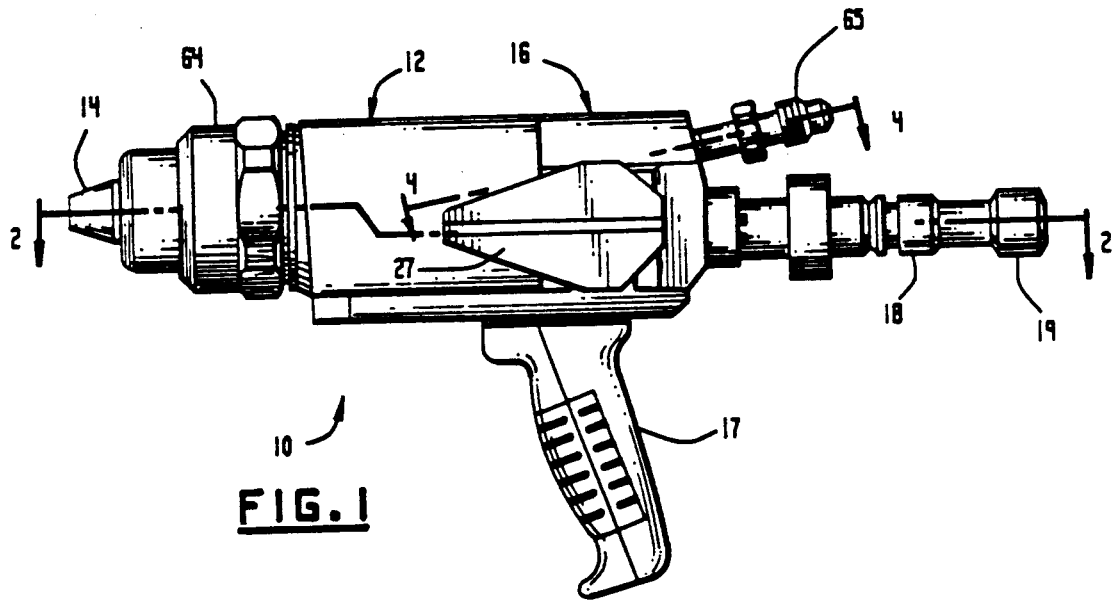
FIG. 1 is an elevation of a thermal spray gun used in the present invention.
Figure 2:
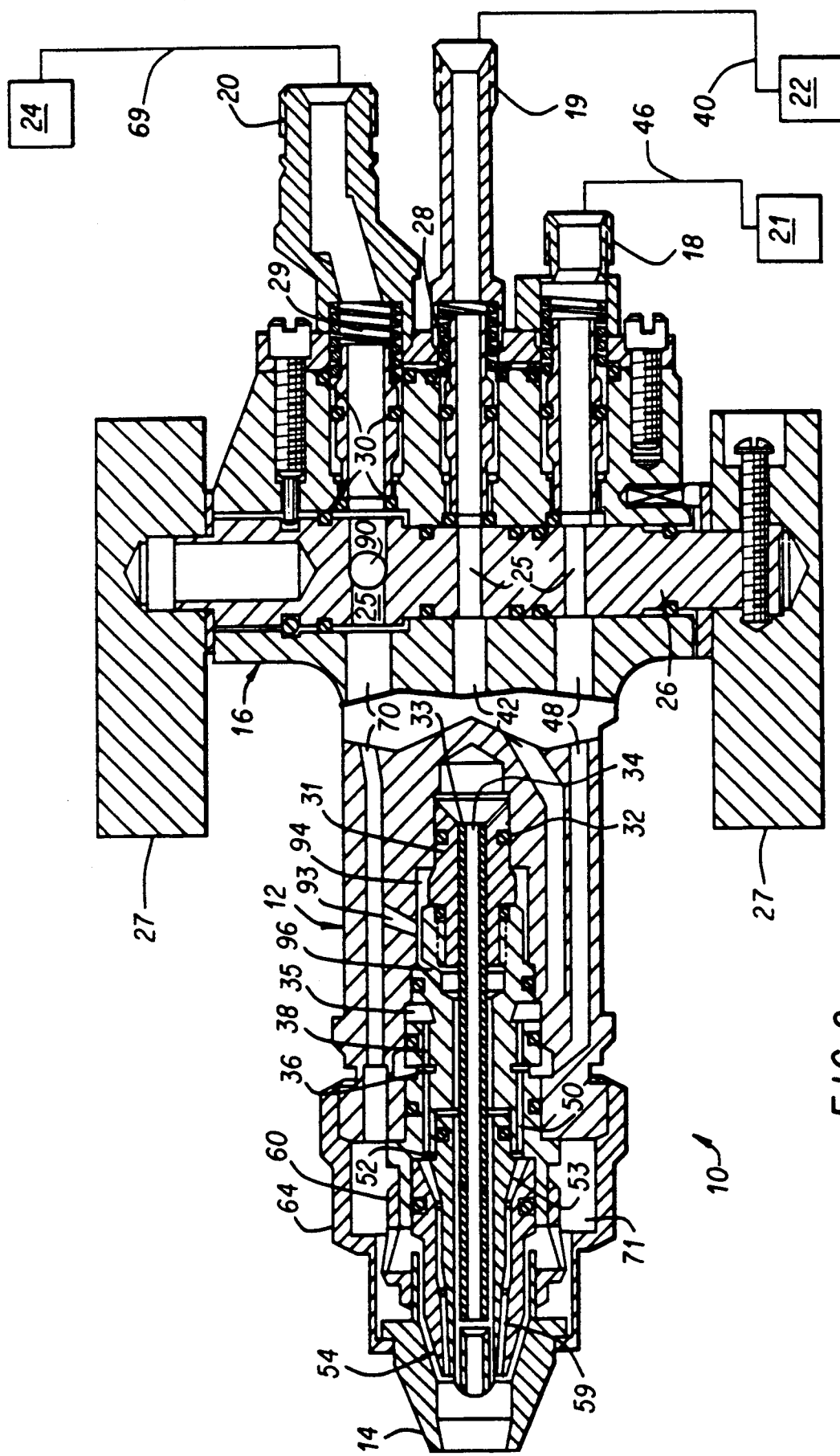
FIG. 2 is a section taken at 2—2 of FIG. 1.

An example of a preferred thermal spray apparatus for effecting the present invention is disclosed in copending U.S. patent application Ser. No. 193,030 filed May 11, 1988, now U.S. Pat. No. 4,865,252, assigned to the assignee of the present invention and detailed herein below. The apparatus is illustrated in FIG. 1, and FIG. 2 shows a horizontal section thereof. A thermal spray gun 10 has a gas head 12 with a tubular member in the form of a gas cap 14 mounted thereon, a valve portion 16 for supplying fuel, oxygen and air to the gas head, and a handle 17. The valve portion 16 has a hose connection 18 for a fuel gas, a hose connection 19 for oxygen and a hose connection 20 for air. The three connections are connected respectively by hoses from a fuel source 21, oxygen source 22 and air source 24. Orifices 25 in a cylindrical valve 26 control the flow of the respective gases from their connections into the gun. The valve and associated components are, for example, of the type taught in U.S. Pat. No. 3,530,892 (Charlop), and include a pair of valve levers 27, and sealing means for each gas flow section that include plungers 28, springs 29 and O-rings 30.

A cylindrical siphon plug 31 is fitted in a corresponding bore in gas head 12, and a plurality of O-rings 32 thereon maintain a gas-tight seal. The siphon plug is provided with a tube 33 having a central passage 34. The siphon plug further has therein an annular groove 35 and a further annular groove 36 with a plurality of inter-connecting passages 38 (two shown). With cylinder valve 26 in the open position as shown in FIG. 2, oxygen is passed by means of a hose 40 through its connection 19 and valve 26 into a passage 42 from whence it flows into groove 35 and through passage 38. A similar arrangement is provided to pass fuel gas from source 21 and a hose 46 through connection 18, valve 26 and a passage 48 into groove 36, mix with the oxygen, and pass as a combustible mixture through passages 50 aligned with passages 38 into an annular groove 52. Annular groove 52 feeds the mixture into a plurality of passages 53 in the rear section of a nozzle member 54.

Figure 3:
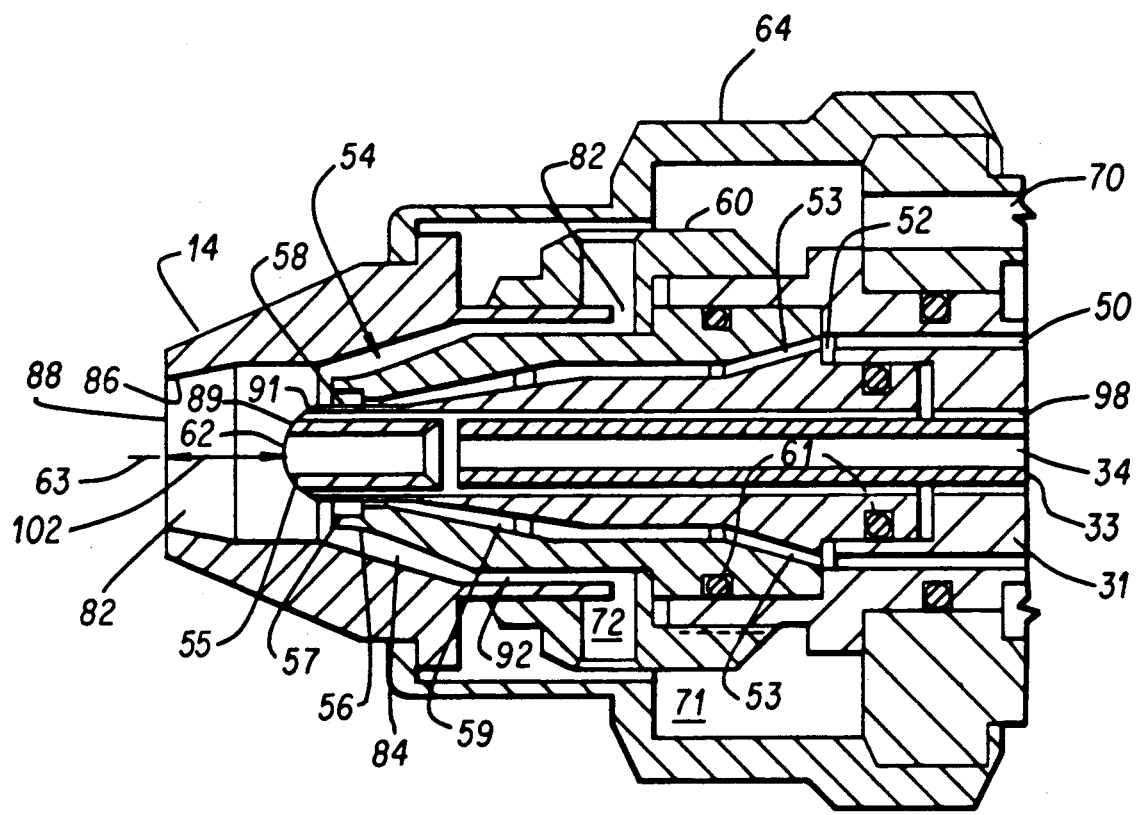
FIG. 3 is an enlargement of the forward end of the section of FIG. 2.

Referring to FIG. 3 for details, nozzle member 54 is conveniently constructed of a tubular inner portion 55 and a tubular outer portion 56. (As used herein and in the claims, "inner" denotes toward the axis and "outer" denotes away from the axis. Also "forward" or "forwardly" denotes toward the open end of the gun; "rear", "rearward" or "rearwardly" denotes the opposite.) Outer portion 56 defines an outer annular orifice means for injecting the annular flow of the combustible mixture into the combustion chamber. The orifice means preferably includes a forward annular opening 57 with a radially inward side bounded by an outer wall 58 of the inner portion. The orifice system leading to the annular opening from passages 53 may be a plurality of arcuately spaced orifices, but preferably is an annular orifice 59.

The combustible mixture flowing from the aligned grooves 52 thus passes through the orifice (or orifices) 59 to produce an annular flow which is ignited in annular opening 57. A nozzle nut 60 holds nozzle 54 and siphon plug 28 on gas head 12. Two further O-rings 61 are seated conventionally between nozzle 54 and siphon plug 31 for gas tight seals. The burner nozzle 54 extends into gas cap 14 which is held in place by means of a retainer ring 64 and extends forwardly from the nozzle.

Figure 4:
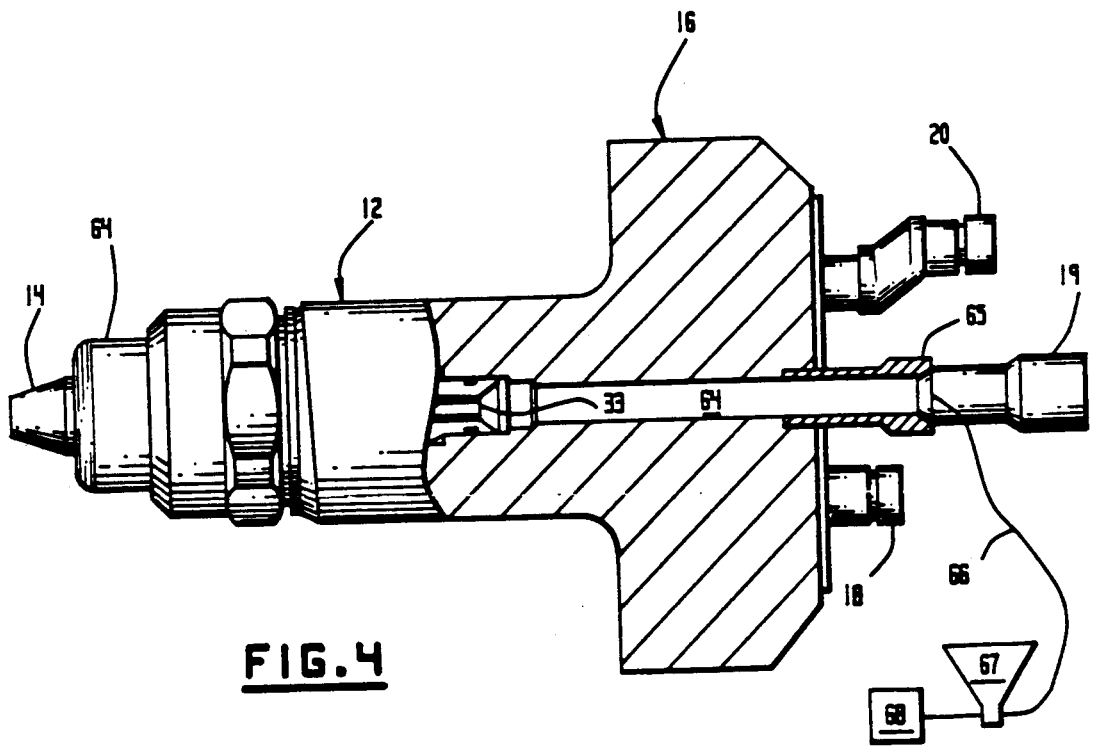
FIG. 4 is a section taken at 4—4 of FIG. 1, and a schematic of an associated powder feeding system.

Nozzle member 54 is also provided with an axial bore 62, for the powder in a carrier gas, extending forwardly from tube passage 33. Alternatively the powder may be injected through a small-diameter ring of orifices (not shown) proximate the axis 63 of the gun. With reference to FIG. 4 a diagonal passage 64 extends rearwardly from tube 33 to a powder connection 65. A carrier hose 66 and, therefore, central bore 62, is receptive of powder from a powder feeder 67 entrained in a carrier gas from a pressurized gas source 68 such as compressed air by way of feed hose 66. Powder feeder 67 is of the conventional or desired type but must be capable of delivering the carrier gas at high enough pressure to provide powder into the chamber 82 in gun 10.

With reference back to FIGS. 2 and 3, air or other noncombustible gas is passed from source 24 and a hose 69 through its connection 20, cylinder valve 26, and a passage 70 to a space 71 in the interior of retainer ring 64. Lateral openings 72 in nozzle nut 60 communicate space 71 with a cylindrical combustion chamber 82 in gas cap 14 so that the air may flow as an outer sheath from space 71 through these lateral openings 72, thence through an annular slot 84 between the outer surface of nozzle 54, and an inwardly facing cylindrical wall 86 defining combustion chamber 82 into which slot 84 exits. The flow continues through chamber 82 as an annular outer flow mixing with the inner flows, and out of the open channel at open end 88 in gas cap 14. Chamber 82 is bounded at its opposite, rearward end by face 89 of nozzle 54.

Preferably combustion chamber 82 converges forwardly from the nozzle at an angle with the axis, most preferably between about 2° and 10°, e.g. 5°. Slot 84 also converges forwardly at an angle with the axis, most preferably between about 12° and 16°, e.g. 14.5°. Slot 84 further should have sufficient length for the annular air flow to develop, e.g. comparable to chamber length 102, but at least greater than half of such length 102. In addition, the chamber should converge at a lesser angle than the slot, most preferably between about 8° and 12°, e.g. 10° less. This configuration provides a converging air flow with respect to the chamber to minimize powder buildup on the chamber wall.

The air flow rate should be controlled upstream of slot 84 such as in a rearward narrow orifice 92 or with a separate flow regulator. For example slot length is 8 mm, slot width is 0.38 mm on a 15 mm circle, and air pressure to the gun (source 24) is 4.9 kg/cm$^2$ (70 psi) to produce a total air flow of 425 std 1/min (900 scfh) with a pressure of 4.2 kg/cm$^2$ (60 psi) in chamber 82.

Also, with valve 26 in a lighting position aligning bleeder holes as described in aforementioned U.S. Pat. No. 3,530,892, an air hole 90 in valve 26 allows air flow for lighting, and the above-indicated angles and dimensions are important to allow such lighting without backfire. (Bleeder holes in valve 26 for oxygen and fuel for lighting, similar to air hole 90, are not shown.) The inner portion 55 of nozzle member 54 has therein a plurality of parallel inner orifices 91 (e.g. 8 orifices 0.89 mm diameter) on a bolt circle (e.g. 2.57 mm diameter) which provide for an annular inner sheath flow of gas, preferably air, about the central powder feed issuing from bore 62 of the nozzle. This inner sheath of air contributes significantly to reducing any tendency of buildup of powder material on wall 86. The sheath air is conveniently tapped from passage 70, via a duct 93 (FIG. 2) to an annular groove 94 around the rear portion of siphon plug 31 and at least one orifice 96 into an annular space 98 adjacent tube 33. Preferably at least three such orifices 96 are equally spaced arcuately to provide sufficient air and to minimize vortex flow which could detrimentally swirl the powder outwardly to wall 86 of chamber 82. The inner sheath air flow should be between 1% and 10%, preferably about 2% and 5% of the outer sheath flow rate, for example about 3%. The inner sheath may alternatively be regulated independently of the outer sheath air, for better control.

Chances of powder buildup are further minimized by having the inner portion 55 of the nozzle member protrude into chamber 82 forwardly of the outer portion 56 as depicted in FIGS. 2 and 3. A chamber length 102 may be defined as the shortest distance from nozzle face 89 to open end 88, i.e. from the forwardmost point on the nozzle to the open end. The forwardmost point on the inner portion should protrude forwardly from the outer portion 56 by a distance between about 10% and 40% of chamber length 102, e.g. 30%.

A preferred configuration for the inner portion is depicted in FIGS. 2 and 3. Referring to the outer wall 58 of inner portion 55 of the nozzle, which defines annular opening 57, such wall 58 should extend forwardly from the annular opening with a curvature inward toward the axis. The curvature should be uniform. For example, as shown, the curvature is such as to define a generally hemispherical face 89 on inner portion 58. It is believed that the combustion flame is thereby drawn inwardly to maintain the flows away from chamber wall 86.

As an example of further details of a thermal spray gun incorporating the present invention, siphon plug 31 has 8 oxygen passages 38 of 1.51 mm each to allow sufficient oxygen flow, and 1.51 mm diameter passages 50 for the gas mixture. In this gas head central bore 62 is 3.6 mm diameter, and the open end 88 of the gas cap is 0.95 cm from the face of the nozzle (length 102). Thus the combustion chamber 82 that also entrains the powder is relatively short, and generally should be between about one and two times the diameter of open end 88.

A supply of each of the gases to the cylindrical combustion chamber is provided at a sufficiently high pressure, e.g. at least 30 psi above atmospheric, and is ignited conventionally such as with a spark device, such that the mixture of combusted gases and air will issue from the open end as a supersonic flow entraining the powder. The heat of the combustion will at least heat soften the powder material such as to deposit a coating onto a substrate. Shock diamonds should be observable. Because of the annular flow configuration, an expansion type of nozzle exit is not necessary to achieve the supersonic flow.

Figure 5:
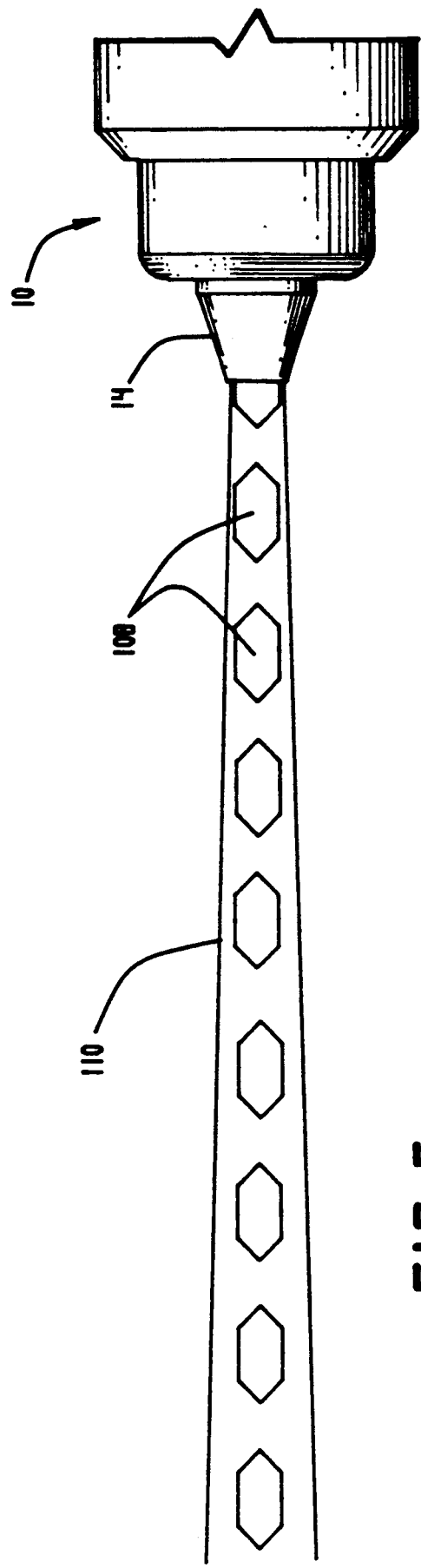
FIG. 5 is a schematic view of the gun of FIG. 1 producing a supersonic spray stream according to the present invention.
Figure 6:
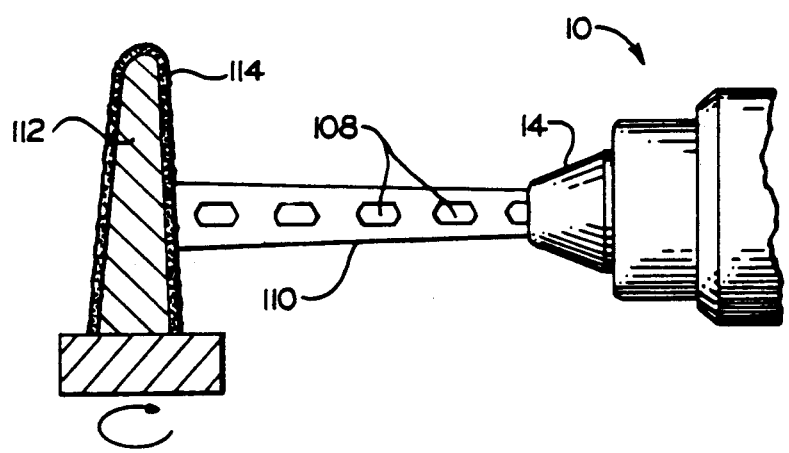
FIG. 6 is the view of FIG. 5 with a substrate in place.

The combustion gas may be propane or hydrogen or the like, but it is preferable that the combustion gas be propylene gas, or methylacetylene-propadiene gas ("MPS"). These latter gases allow a relatively high velocity spray stream and excellent coatings to be achieved without backfire. For example with a propylene or MPS pressure of about 7 kg/cm$^2$ gauge (above atmospheric pressure) to the gun, oxygen at 10 kg/cm$^2$ and air at 5.6 kg/cm$^2$ at least 8 shock diamonds are readily visible in the spray stream without powder flow. The appearance of these shock diamonds 108 in spray stream 110 is illustrated in FIG. 5. The position of a glass mold plunger substrate 112 on which a coating 114 is sprayed is preferably about where the fifth full diamond would be as shown in FIG. 6, e.g. about 9 cm spray distance. Preparation of the substrate includes machining to size taking coating thickness into account, and grit blasting the surface in the usual manner to clean and roughen it. The substrate is cylindrical and is rotated in a head stock while being coated.

According to the present invention a self-fluxing alloy is coated onto a glass mold plunger substitute by supersonic combustion thermal spraying, for example with a gun as described in aforementioned U.S. Pat. No. 4,416,421, but preferably with a gun of the type detailed hereinabove for relative freedom from internal buildup of coating material and other advantages as outlined in aforementioned application Ser. No. 193,030. It has been discovered that the coatings sprayed with high velocity are so uniform and dense that, when polish finished, the surfaces are virtually free of defects. It was further discovered, surprisingly, that the high quality coatings could be achieved with a substantial reduction in technique dependence and reject rate over the prior thermal spray method.

Further, with high velocity it often is unnecessary to subsequently fuse the coating to achieve a flawless polish finish, thus eliminating a step that has not only a significant cost but its own technique dependence with associated problems. However if fusing is deemed necessary, it is achieved more easily and requires less grinding because of the quality of the original deposit. Fusing is effected by conventional methods such as with a flame torch or, preferably, a controlled furnace with a reducing atmosphere.

Coating thickness as sprayed is about 0.7 mm to 1.3 mm. Coating removal by grinding is typically about 0.15 mm to 0.3 mm, compared with 0.5 mm for prior art sprayed and fused coatings.

The self-fluxing alloy is conventionally of the types disclosed in the aforementioned U.S. Pat. No. 2,875,043 and British Patent No. 867,455. A preferable type of alloy for coating glass mold plungers consists essentially of about 10% to 18% chromium, 2% to 4% boron, up to 4% silicon, up to a total of 9% of one or more of molybdenum, copper, iron and tungsten, 0.15% to 1.0% carbon, balance nickel and or cobalt to a total of 100%. The self-fluxing alloy is used as-is but may be mixed with other metals such as simple nickel chromium alloy, composite nickel-aluminum powder or molybdenum to enhance fusing or other characteristics.

For optimum wear resistance the self-fluxing alloy powder particles should be blended with hard, nonmetal particles such as the oxide particles of the aforementioned U.S. Pat. No. 4,382,811, a boride or a nitride, or a carbide such as nickel bonded titanium carbide, or the like. Perfectly the hard particles are carbide particles, which generally should be in the range of about 30% to 70% by weight of the blend. More preferably the carbide particles consist essentially of tungsten carbide in a cobalt matrix and, for optimum finish, the tungsten carbide is in the form of subparticles of substantially $-5$ microns in the cobalt matrix. Most preferably the subparticles are about 1 to 2 microns. Such particles are produced by sintering such subparticles with the cobalt which should constitute about 12% to 20% by weight of the total of the tungsten carbide and the cobalt. Alternatively the powder is produced by spray drying such as taught in U.S. Pat. No. 3,617,358 (Dittrich).

EXAMPLE 1

A glass mold plunger substrate is machined from mild steel stock, with a length of 12.7 cm and an diameter of 2.5 cm at its gripping end tapered down to 1.3 cm at its plunger end which is rounded. The surface is prepared by grit blasting with G24/40 aluminum oxide grit at 4.2 kg/cm$^2$ (60 psig) air pressure.

A powder blend similar to Metco 34F (except size) sold by The Perkin-Elmer Corporation, Westbury, NY, is prepared consisting of 50% self-fluxing alloy and 50% tungsten carbide/cobalt. The alloy consists of 17% chromium, 4% iron, 3.5% boron, 4% silicon, 1% carbon and balance nickel and incidental impurities (vis AMS 4775A alloy). Alloy powder size is $-53+10$ microns. The carbide is 12% cobalt bonded tungsten carbide, with subparticles of about 1 to 2 microns manufactured by spray drying substantially as taught in Example 1 of the aforementioned U.S. Pat. No. 3,617,358. Carbide size is $-53+10$ microns.

The blend is sprayed with the preferred apparatus described above with respect to FIGS. 1–3, specifically a Metco Type DJ(TM) Gun sold by The Perkin-Elmer Corporation, Westbury, New York, using a #3 insert, #3 injector, "A" shell, #2 siphon plug and #2 air cap. Oxygen was 10.5 kg/cm$^2$ (150 psig) and 212 l/min (450 scfh), propylene gas at 7.0 kg/cm$^2$ (100 psig) and 47 l/min (100 scfh), and air at 5.3 kg/cm$^2$ (75 psig) and 290 l/min (615 scfh). A high pressure powder feeder of the type disclosed in the present assignee's co-pending U.S. patent application Ser. No. 07/260625 filed Oct. 21, 1988, U.S. Pat. No. 4,900,199 and sold as a Metco Type DJP powder feeder by Perkin-Elmer is used to feed the powder blend at 60 gm/min (8 lbs/hr) in a nitrogen carrier 8.8 kg/cm$^2$ (125 psig) and 7 l/min (15 scfh). Spray distance is 20 cm (8 inches).

The as-sprayed coating is ground conventionally with a diamond wheel, and polished. Diamond wheels are used at 5500 surface feet per minute (1675 m/min), rough grind with a 240 grit wheel, size with a 400 grit wheel and finish with a 600 grit wheel. For a lapped finish, diamond compound is used. (As used herein and in the claims the term "grind finishing" includes all course and fine grinding and polishing steps conventionally used to effect the finish achievable on the coated surface.) A mirror-like 5 micron aa finish is achieved. The resulting glass mold plunger is excellent for its purpose.

EXAMPLE 2

Example 1 is repeated except that a spray distance of 25 cm is used. Similar results are achieved, demonstrating tolerance in technique dependence.

EXAMPLE 3

Example 1 is repeated except that the as-sprayed is fused before the grinding step. Fusing is effected in a furnace with a hydrogen atmosphere at 1000°–1075° C. for 15 minutes. After grinding and polishing the finish is 4 microns aa.

EXAMPLE 4

Example 1 is repeated except that the carbide is omitted from the blend; i.e. neat self-fluxing alloy is used. A final surface finish of 4 microns aa is achieved. Use for producing glass objects is similar except that the life of the plunger is shorter due to the greater wear of the neat alloy.

While the invention has been described above in detail with reference to specific embodiments, various changes and modifications which fall within the spirit of the invention and scope of the appended claims will become apparent to those skilled in this art. The invention is therefore only intended to be limited by the appended claims or their equivalents.

What is claimed is:

1. A method for manufacturing a glass mold plunger utilizing a thermal spray gun having combustion chamber means therein with a combustion chamber and an open channel for propelling combustion products into the ambient atmosphere at supersonic velocity, the method comprising the steps of preparing a glass mold plunger substrate for receiving a thermal sprayed coating, feeding through the open channel a powder comprising self-fluxing alloy particles, injecting into the chamber and combusting therein a combustible mixture of combustion gas and oxygen at a pressure in the chamber sufficient to produce a supersonic spray stream containing the powder issuing through the open channel, directing the spray stream toward the glass mold plunger substrate such as to produce a coating thereon, fusing the coating and grind finishing the fused coating to a polished finish.

2. A method according to claim 1 wherein the self-fluxing alloy consists essentially of about 10% to 18% chromium, 2% to 4% boron, up to 4% silicon, up to a total of 9% of one or more of molybdenum, copper, iron and tungsten, 0.15% to 1.0% carbon, and balance nickel and/or cobalt.

3. A method according to claim 1 wherein the combustible mixture is injected at a sufficient pressure into the combustion chamber to produce at least 8 visible shock diamonds in the spray stream in the absence of powder-carrier gas feeding.

4. A method according to claim 3 further comprising selecting the combustion gas from the group consisting of propylene gas and methylacetylene-propadiene gas.

5. A method according to claim 1 wherein the powder is a blend consisting essentially of the self-fluxing alloy particles and hard non-metal particles.

6. A method according to claim 5 wherein the hard particles are carbide particles.

7. A method according to claim 6 wherein the carbide particles constitute about 30% to 70% by weight of the blend.

8. A method according to claim 6 wherein the carbide particles consist essentially of tungsten carbide subparticles in a cobalt matrix.

9. A method according to claim 8 wherein the tungsten carbide subparticles are substantially −5 microns.

10. A method according to claim 8 wherein the cobalt constitutes about 12% to 23% by weight of the total of the tungsten carbide and the cobalt.

11. A method according to claim 5 wherein the self-fluxing alloy consists essentially of about 10% to 18% chromium, 2% to 4% boron, up to 4% silicon, up to a total of 9% of one or more of molybdenum, copper, iron and tungsten, 0.15% to 1.0% carbon, balance nickel and/or cobalt, and the powder is a blend consisting essentially of the self-fluxing alloy particles and carbide particles, the carbide particles constituting about 30% to 70% by weight of the blend and consisting essentially of −5 micron tungsten carbide subparticles in a cobalt matrix, and the cobalt constituting about 12% to 20% by weight of the total of the tungsten carbide and the cobalt.

12. A method for producing a glass mold plunger utilizing a thermal spray gun including a nozzle member with a nozzle face and a tubular gas cap extending from the nozzle member, the gas cap having an inwardly facing cylindrical wall defining a combustion chamber with an open end and an opposite end bounded by the nozzle face, the method comprising the steps of preparing a glass mold plunger substrate for receiving a thermal sprayed coating, injecting an annular flow of a combustible mixture of a combustion gas and oxygen from the nozzle coaxially into the combustion chamber at a pressure therein of at least two bar above atmospheric pressure, injecting an annular outer flow of pressurized non-combustible gas adjacent to the cylindrical wall radially outward of the annular flow of the combustible mixture, feeding a powder comprising self-fluxing alloy particles in a carrier gas axially from the nozzle into the combustion chamber, injecting an annular inner flow of pressurized gas from the nozzle member into the combustion chamber coaxially between the combustible mixture and the powder-carrier gas, combusting the combustible mixture in the combustion chamber whereby a supersonic spray stream containing the heat fusible material in finely divided form is propelled through the open end, and directing the spray stream toward the glass mold plunger substrate such as to produce a coating thereon, fusing the coating and grind finishing the coating fused to a polished finish.

13. A method according to claim 12 wherein the self-fluxing alloy consists essentially of about 10% to 18% chromium, 2% to 4% boron, up to 4% silicon, up to a total of 9% of one or more of molybdenum, copper, iron and tungsten, 0.15% to 1.0% carbon, and balance nickel and/or cobalt, and the powder is a blend consisting essentially of the self-fluxing alloy particles and the carbide particles, the carbide particles constituting about 30% to 70% by weight of the blend and constituting essentially of −5 micron tungsten carbide subparticles in a cobalt matrix, and the cobalt constituting about 12% to 23% by weight of the total of the tungsten carbide and the cobalt.

* * * * *